3,574,798
DIARYL PHOSPHORHYDRAZIDOTHIONATE PROCESS

Andrew C. Hazy and Franklin P. Darmory, New Haven, Conn., assignors to Olin Corporation
No Drawing. Filed Nov. 12, 1968, Ser. No. 775,153
Int. Cl. C07f 9/14, 9/22
U.S. Cl. 260—984                                 3 Claims

ABSTRACT OF THE DISCLOSURE

Diaryl phosphorhydrazidothionates are prepared by reacting a pheol having the formula ROH wherein R is alkyl-substituted phenyl having 9 to 18 carbon atoms, with thiophosphoryl chloride and hydrazine in the presence of potassium carbonate in a chloroform medium at 40–70° C. These diaryl phosphorhydrazidothionates are valuable antioxidants for polyolefins.

---

This invention relates to an improved process for preparing diaryl phosphorhydrazidothionates. More particularly, this invention relates to an economical, one-step process for preparing the aforementioned diaryl phosphorhydrazidothionates in high yields and excellent purity.

The diaryl phosphorhydraziothionates provided by the process of this invention are valuable antioxidants, having particular utility in the stabilization of polyolefins. Thus, when incorporated into polypropylene, they provide polymer compositions having improved stability with respect to color, heat, oxidation, and physical properties. Furthermore, these diaryl phosphorhydrazidothionates are effective antioxidants for synthetic rubbers, polyurethane resins, and a wide variety of other materials normally susceptible to deterioration by oxidation.

Selected diaryl phosphorhydrazidothionates have been previously prepared by a commercially unattractive two-step process. Thus, Autenrieth and Hildebrand, Ber. 31, 1108 (1898), disclose the reaction of p-chlorophenol with thiophosphoryl chloride in the presence of sodium hydroxide to provide bis-p-chlorophenol phosphorchloroidothionate. In Ber. 49, 63–87 (1916), W. Strecker et al. disclose the reaction of pure bis-phenyl phosphorchlorido-thionate with hydrazine to provide bis-phenyl phosphorhydrazidothionate.

Attempts to combine the two reactions described above in a one-step process have been generally unsuccessful. Thus, it has been found that impure diaryl phosphorhydrazidothionates are obtained in less than 60% yield where a one-step process employing sodium hydroxide as a base is employed.

The principal object of this invention is to provide a process for preparing diaryl phosphorhydrazidothionates in high yields and excellent purity. Another object is to provide a simplified, one-step, economical process for the preparation of commercial quantities of diaryl phosphorhydrazidothionates.

The foregoing objects have been accomplished in accordance with the improved process of this invention wherein diaryl phosphorhydraziothionates are obtained by reacting an appropriate phenol with thiophosphoryl chloride, employing potassium carbonate as the base and chloroform as the solvent medium, to provide bis-aryl phosphorchloridothionate and subsequently reacting the phosphorchloridothionate in situ with hydrazine.

The selected process of this invention is characterized by the use of a specific base and solvent in an economical one-step process wherein significantly improved yields, i.e., 78% and better, of pure diaryl phosphorhydrazidothionates are obtained.

The formation of diaryl phosphorhydrazidothionates is exemplified by the following equation:

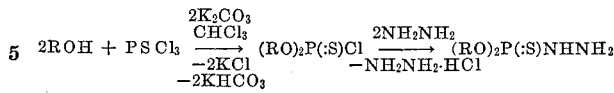

$$2\text{ROH} + \text{PSCl}_3 \xrightarrow[\substack{-2\text{KCl} \\ -2\text{KHCO}_3}]{\substack{2\text{K}_2\text{CO}_3 \\ \text{CHCl}_3}} (\text{RO})_2\text{P}(:S)\text{Cl} \xrightarrow[-\text{NH}_2\text{NH}_2 \cdot \text{HCl}]{2\text{NH}_2\text{NH}_2} (\text{RO})_2\text{P}(:S)\text{NHNH}_2$$

wherein R is alkyl-substituted phenyl having a total of 9 to 18 carbon atoms.

Representative of the phenols employed in the process of this invention are p-tert-butylphenol, p-tert-octylphenol, p-tert-nonylphenol, 2,4,6-trimethylphenol, etc. While a wide variety of phenols can be employed in the practice of this invention, preferred embodiments utilize monoalkyl-substituted phenols.

Preferably, at least one mol equivalent of potassium carbonate is employed per mol equivalent of phenol. Thus, according to the stoichiometry of the reaction, two mol equivalents of phenol, one mol equivalent of thiophosphoryl chloride, and at least two mol equivalents of potassium carbonate are employed. Preferably, the potassium carbonate is employed in an amount exceeding the stoichiometric requirements. The use of this excess amount of potassium carbonate can be employed in alternate fashion. Thus, the total amount can be added initially, or the stoichiometric amount can be used initially with the excess being added with, or after, the addition of hydrazine to the reaction mixture.

As previously mentioned, the use of chloroform as an inert solvent medium is also critical to the selective process of this invention. In order to obtain optimum yield, it is preferable that at least 3 ml. of chloroform be employed per gram of phenol starting reactant.

After completion of the reaction of the phenol with thiophosphoryl chloride to provide bis-aryl phosphorchloridothionates, hydrazine is added to the reaction mixture. Anhydrous hydrazine is advantageously used, but hydrazine hydrate is preferably employed.

While two mols of hydrazine can be employed per mol of bis-aryl phosphorchloridothionate intermediate as indicated in the aforementioned equation, it will be apparent that greater or lesser amounts can be used. However, it is preferred to use one mol of hydrazine per mol of bis-aryl phosphorchloridothionate intermediate while employing excess potassium carbonate to act as the acid acceptor.

The process of this invention is carried out at a temperature of 40–70°C. Preferably, the reaction is carried at atmospheric pressure at a temperature of about 50° C. to the reflux temperature of the system, i.e., about 62° C. However, temperatures up to about 70° C. can be employed if the process is carried out in pressure equipment.

The desired diaryl phosphorhydrazidothionates are readily isolated from the reaction medium by conventional techniques, such as filtration, recrystallization, etc.

The following examples will serve to illustrate the preparation of diaryl phosphorhydrazidothionates in accordance with the process of this invention.

EXAMPLE I

To a stirred, refluxing mixture of 613 g. (4.08 mols) of p-tert-butylphenol and 580 g. (4.20 mols) of finely powdered potassium carbonate in 1800 ml. of chloroform was added, dropwise, 208 ml. (2 mols) of thiophosphoryl chloride. After completion of the addition, which required four hours, the reaction mixture was refluxed overnight. Then, 250 ml. (4.30 mols) of 85% hydrazine hydrate was added, with stirring, to the reaction mixture. After refluxing for an additional eight hours, the reaction mixture was cooled to room temperature and filtered to remove solid by-products. The filtrate was concentrated in vacuo to provide a solid which was washed with 600 ml. of isopropanol. Recrystallization of this solid from heptane provided 613 g. of white solid, M.P. 123–125° C. Infrared analysis, which showed —$NH_2$ absorption at 3.0μ, and the following analytical data revealed that bis-p-tertbutylphenylphosphorhydrazidothionate had been obtained. (Yield: 78%.) The structure of the product was confirmed by nuclear magnetic resonance, which revealed peaks at 1.29δ (18 H, singlet); 3.48δ (2H, singlet, broad); 4.92δ( 1H, doublet, J=45 c.p.s.); and 7.0–7.5δ (8H, multiplet).

Analysis.—Calcd. for $C_{20}H_{29}N_2O_2PS$ (percent): C, 61.20; H, 7.45; N, 7.14; P, 7.89; S, 8.17. Found (percent): C, 61.31, 61.27; H, 7.29, 7.32; N, 7.28, 7.25; P, 7.79, 7.84; S, 7.95, 7.87.

EXAMPLE II

Following the procedure of Example I, a mixture of 15.0 g. (0.10 mol) of p-tert-butylphenol, 13.8 g. (0.10 mol) of potassium carbonate and 5.2 ml. (0.05 mol) of thiophosphoryl chloride in 50 ml. of chloroform was refluxed overnight. To the well-stirred reaction mixture was added 6.0 g. (0.05 mol) of powdered potassium carbonate and 3.0 ml. (0.05 mol) of 85% hydrazine hydrate. After refluxing overnight, the reaction mixture was cooled to room temperature and filtered. Then, the filtrate was concentrated in vacuo to provide 22 g. of white solid which was recrystallized from isopropanol to give 17.6 g. of solid, M.P. 114–118° C. A second recrystallization from heptane provided 16.8 g. of bis-p-tert-butylphenylphosphorhydrazidothionate, M.P. 123–125° C. (Yield: 86%.)

COMPARATIVE EXAMPLE I

For purposes of comparison, the general procedure of Examples I and II was repeated employing sodium hydroxide as the base instead of potassium carbonate.

A solution of 2.4 g. (0.06 mol) of sodium hydroxide in 35 ml. of water was treated with 7 ml. of isopropanol followed by 8.84 g. (.059 mol) of p-tert-butylphenol. The resulting solution was chilled to 30° C. and 4.83 g. (.0285 mol) of thiophosphoryl chloride was added over a 40-minute period while maintaining a temperature of 35–37° C. After stirring for one hour, the reaction mixture was treated with 6 ml. of chloroform and 3 ml. of 85% aqueous hydrazine. Upon heating the mixture to 50° C., a slight hydrogen sulfide evolution occurred; heating with stirring was continued for 20 hours. Then the mixture was extracted with chloroform and the extract was dried with anhydrous magnesium sulfate, filtered and evaporated in vacuo to dryness. Recrystallization of the solid residue from isopropanol provided 6.7 g. of product, M.P. 111–116° C., representing a 59.8% yield of impure bis-p-tert-butylphenylphosphorhydrazidothionate.

COMPARATIVE EXAMPLES II–V

For further purposes of comparison, different bases and solvents were employed following the general procedure of Example I. In all these examples, no reaction of p-tert-butylphenol with thiophosphoryl chloride to provide the intermediate bis-p-tert-butylphenylphosphorchloridothionate necessary for reaction with hydrazine was observed. The reactants were employed in a mol ratio of p-tert-butylphenol; base; thiophosphoryl chloride of 0.1:0.1:0.05; 100 ml. of solvent was used and the reaction mixtures refluxed overnight, cooled, washed with water, dried and concentrated prior to analysis.

| Comparative example | Base | Solvent |
|---|---|---|
| II | Sodium carbonate | Chloroform. |
| III | do | 1,2-dichloropropane. |
| IV | Calcium carbonate | Do. |
| V | Potassium carbonate | Toluene. |

What is claimed is:

1. A process for preparing diaryl phosphorhydrazidothionates which comprises reacting together, at a temperature of 40–70° C., in a chloroform medium and in the presence of at least two mol equivalents of potassium carbonate:

(a) two mol equivalents of a phenol having the formula ROH wherein R is alkyl-substituted phenyl having 9–18 carbon atoms per (b) one mol equivalent of thiophosphoryl chloride, and (c) at least one mol equivalent of hydrazine.

2. The process of claim 1 wherein R is monoalkyl-substituted phenyl.

3. The process of claim 2 wherein p-tert-butylphenol is employed as the phenol.

References Cited
UNITED STATES PATENTS

| 2,851,475 | 9/1958 | Blair | 260—923 |
| 2,906,770 | 9/1959 | Debo | 260—923X |
| 2,978,479 | 4/1961 | Kayser et al. | 260—974X |

CHARLES B. PARKER, Primary Examiner

R. L. RAYMOND, Assistant Examiner

U.S. Cl. X.R.

260—45.9, 923, 974, 975